UNITED STATES PATENT OFFICE.

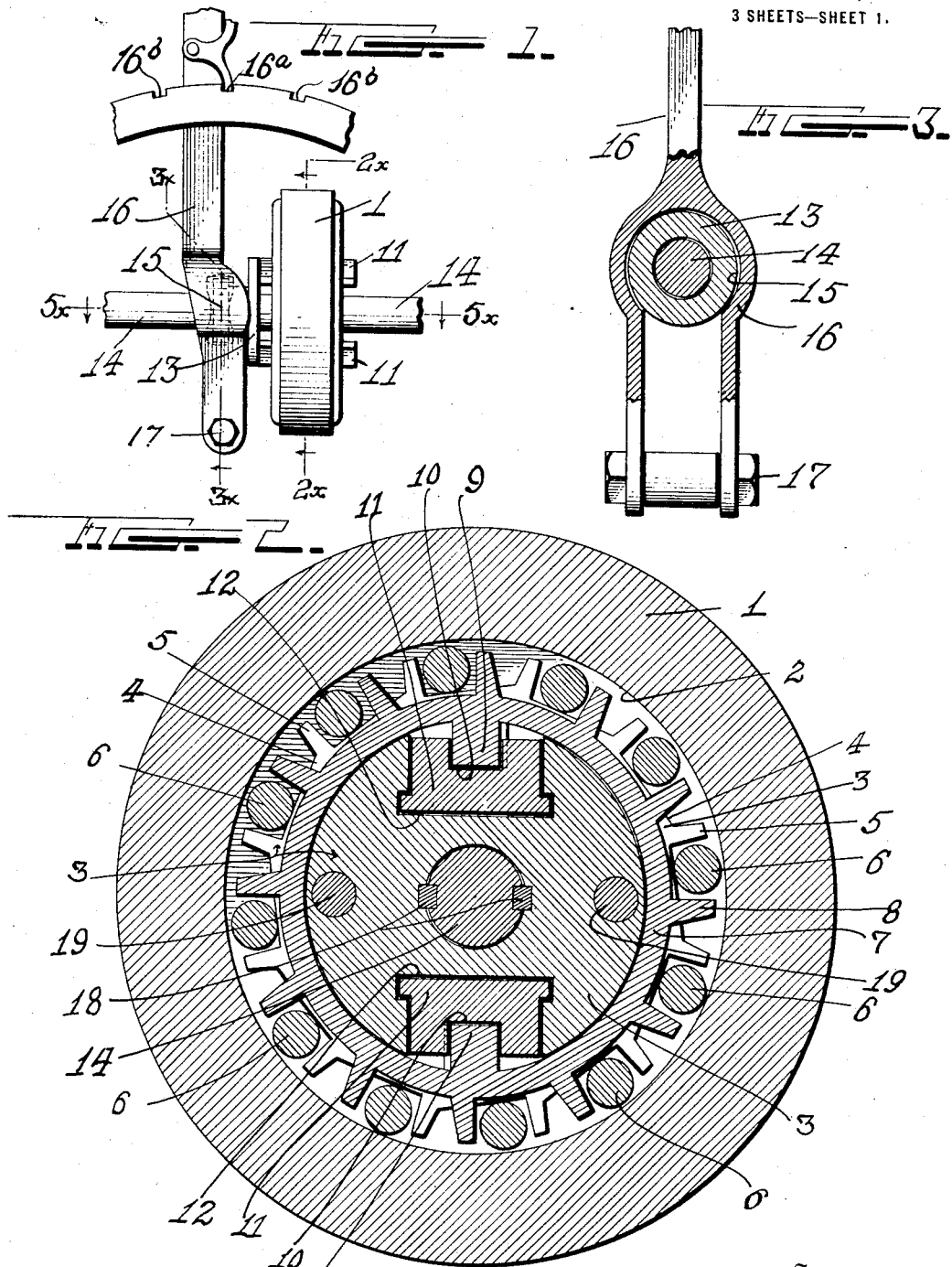

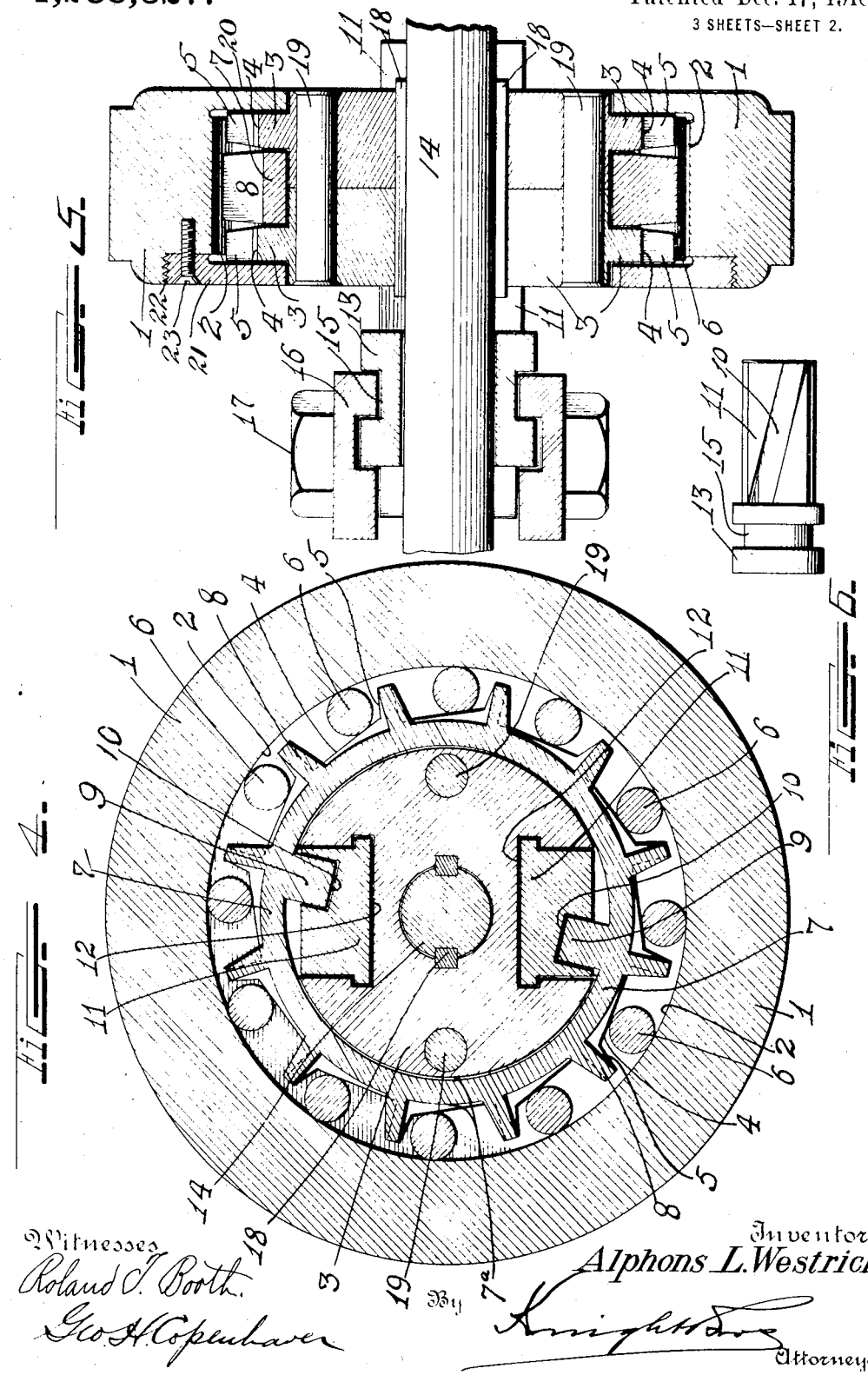

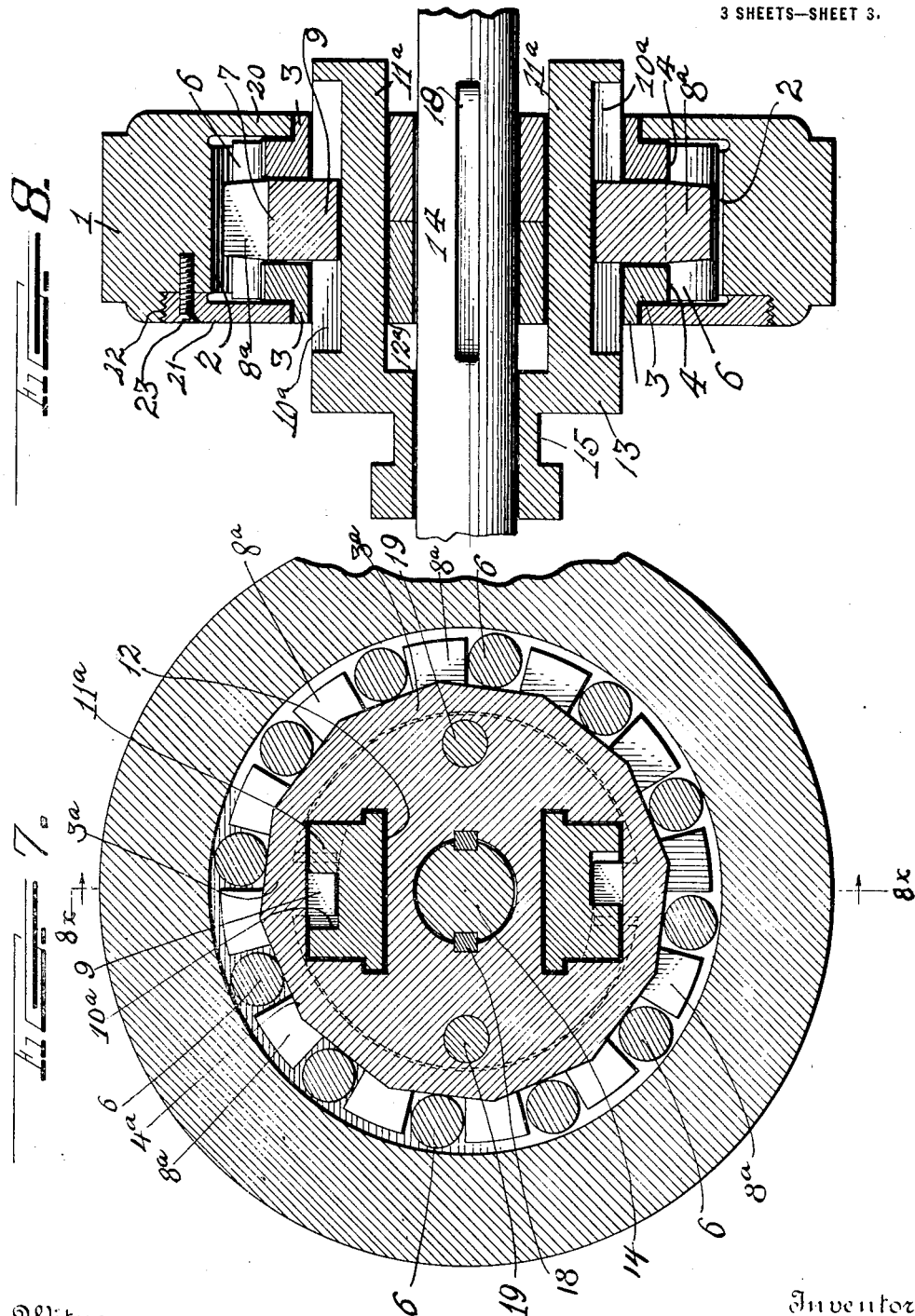

ALPHONS L. WESTRICH, OF TOOELE, UTAH.

ROLLER-CLUTCH.

1,288,327. Specification of Letters Patent. Patented Dec. 17, 1918.

Application filed April 8, 1915, Serial No. 19,954. Renewed December 17, 1917. Serial No. 207,624.

*To all whom it may concern:*

Be it known that I, ALPHONS L. WESTRICH, a citizen of the United States, residing at Tooele, in the county of Tooele and State of Utah, have invented certain new and useful Improvements in Roller-Clutches, of which the following is a specification.

This invention relates to clutches in which the two members between which power is to be transmitted, are interlocked through means of members forced in between two converging surfaces on the respective members to be connected. While the rolling members may be in the form of balls, they are here illustrated as rollers, and while the clutch is adapted for general application, it is herein illustrated as embodied in a construction suitable for power transmission in automobiles. But these limitations pertain to the particular embodiment of the invention selected for purposes of illustration and while, in themselves embracing some of the minor features of the invention are not to be taken as limiting the scope of the invention.

One object of the invention is to provide a clutch of this type with means for positively throwing the rolling members into and out of interlocking position at will, to which end the invention embodies a shifting member having circumferential movement relatively to the main clutch members and constructed to engage the rolling members and move them to and from their different positions.

Another object is to adapt the clutch for both forward and rearward driving, and to this end the opposed faces between which the rolling members are located are made to converge at both ends of the throw of the rolling member, but to recede intermediate of these ends so as to release the clutch members when the rolling members are in intermediate positions.

Further objects relate to the details of construction and coöperative relationship of the device whereby its broader characteristics are embodied in a structure that is conveniently operated, comparatively simple in design, and very durable in use, to which ends, the shipping or shifting member by which the rolling members are positively thrown into and out of interlocking position, is associated with the inner one of two radially overlapping clutch members, of which the outer member has a continuous cylindrical interior gripping face, while the inner member has a plurality of faces opposed to said cylindrical face and constructed to converge therewith; a rolling member being located between the cylindrical face and each converging face and the shifting member having radial projections lying in front and rear of the rolling members in order to shift them. To impart relative circumferential movement to the shifting member on the multiple-face clutch member while the parts are in rotation, an axially sliding yoke on said clutch member has arms with outwardly presented cam grooves that receive inwardly projecting lugs on the shifting member, and this yoke is adapted to be shifted axially by means of an externally fulcrumed shipping lever engaging the yoke through the usual form of wrist bearing.

The invention will be fully understood upon reference to the accompanying drawings, in which—

Figure 1 is a side elevation of the complete clutch;

Fig. 2 is a section on the line $2^x$—$2^x$, Fig. 1, on an enlarged scale;

Fig. 3 is a transverse section on the line $3^x$—$3^x$, of Fig. 1;

Fig. 4 is a section similar to Fig. 2, but showing the parts in different position;

Fig. 5 is an axial section on the line $5^x$—$5^x$, Fig. 1, but on the scale of Figs. 2 and 4;

Fig. 6 is a detail view of the shipping yoke on the scale of Figs. 1 and 3; and

Figs. 7 and 8 are views similar to Figs. 2 and 5, showing a modified construction which makes the clutch double-acting; Fig. 8 being a section on the line $8^x$—$8^x$, Fig. 7.

Referring to Figs. 1 to 6, 1 represents an outer clutch member having a continuous cylindrical inner gripping face 2, and 3 represents an inner clutch member having a plurality of gripping faces 4 opposed to said face 2 and converging toward the same; said faces being divided by radial projections 5 forming pockets for rolling members 6 that are to be wedged between the gripping faces when driving conditions are to be established, or permitted to recede from gripping position and lie in the deeper portions of the pockets when the clutch is to idle.

The rolling members 6 are preferably in the form of rollers, although balls or spheres would be considered the equivalents in their broader aspect. Therefore, when the term "rollers" is hereinafter used, it is to be understood as including the equivalent form of rolling members, except where the contrary is expressly indicated.

In order to positively withdraw the rollers from gripping position, an annular shifting member 7 is mounted in a circumferential groove 7ª in the member 3 and located radially within the gripping faces 4, and said shifting member is provided with radial projections 8 that intercept the paths of the rollers 6; and said shifting members are provided with inwardly presented lugs 9 that work in the longitudinal cam grooves 10 of the shifting arms 11 which slide longitudinally in the guideways 12 of the member 3. The arms 11 are connected by a yoke 13 mounted upon the shaft 14 and formed with a wrist bearing 15 that receives the shipping lever 16 which is fulcrumed at 17. The cam grooves 10 being inclined circumferentially to the axial plane of the clutch (as shown in Fig. 6) will cause a limited circumferential movement in the annular shifting member 7 to be developed from a longitudinal movement of the yoke 13, which is imparted at will through the shipping lever 16. Hence, while the rollers 6 will readily move by friction, gravity or their own inertia into gripping position, when the inner clutch member is rotated in the forward direction (say counter-clockwise in Figs. 2 and 4) relatively to the outer clutch member 1 whenever it is desired to permit the driving member to continue movement independently of the gripping member of the clutch, a positive forward movement of the shifting member 7 relatively to the driving member 3, which can readily be imparted through the shipping lever even though both said parts are rotating together in said direction, will positively unseat the rollers, move them to the idling position (Fig. 2) and hold them there until it is desired to again establish the drive when a movement of the shipping lever in the opposite direction or to the position shown in Fig. 4, will free the rollers and permit them to assume the driving position. Of course, by an increased throw in the annular shifting member 7, the rollers could be positively thrust into their driving positions, but this is not necessary in a single-acting clutch of this type.

When it is desired to have the clutch drive positively in either direction, the inner or driving member of the clutch is given a form substantially as indicated at 3ª in Figs. 7 and 8, in which its faces 4ª are symmetrically disposed with both their ends in gripping relation to the rollers and with their intermediate portions in idling relation thereto; the annular shifting member 7 being provided with oppositely acting radial projections 8ª adapted to release the rollers from driving position in either direction, and preferably so proportioned as to provide restricted pockets for the rollers and thereby adapted not only to hold them in their intermediate or idling positions, but to positively move them into either gripping position, in addition to withdrawing them at will. In this modified embodiment of the device, the lugs 9 work in double-acting cam grooves 10ª in the yoke arms 11ª, which travel longitudinally in the guideways 12, as in the first form, but the shipping lever 16 in this modified form will be adapted to assume an intermediate position as suggested by the notch 16ª in Fig. 1, when the clutch will be idling, or either of two end positions as suggested by the notches 16ᵇ in said figure.

The inner member 3 is preferably made of two parts, both of which are secured by the keys 18 on the shaft 14 and these parts are further secured together by means of the dowels 19. To confine the rollers longitudinally between the clutch members and also to confine the outer clutch member upon the inner one in the absence of the shaft mounting for said outer member, the latter is provided with flanges 20 and 21, of which the latter may be secured in place by threads 22 and a lock screw 23 (Figs. 5 and 8).

By having the member 3 made in two parts, divided by a transverse radial plane, the shifting member 7 may be made in one piece and conveniently mounted in position to lie across the path of the gripping rollers or spheres, as the case may be. It is, of course, understood that if spheres were used in place of rollers, the gripping surfaces would be modified to conform.

I claim:—

1. In a roller clutch, the combination of relatively rotatable clutch members to be connected, having opposed bearing faces, gripping rollers between said bearing faces, each of the bearing faces on one member being inclined to the opposed bearing face on the other member and causing the gripping members to move into and out of gripping relation to the members by their movements on said inclined faces, and shifting means positioned medially of said bearing faces independent of the clutch members for positively moving the rollers on the inclined faces, comprising an annular shifting member having radial projections intercepting the paths of the rollers, and inwardly presented lugs, axially sliding arms having cams co-acting with said lugs, a yoke connected with said arms, and a shipping lever coacting with said yoke.

2. In a roller clutch, the combination of relatively rotatable clutch members to be connected, having opposed bearing faces, gripping rollers between said bearing faces, each of the bearing faces on one member being inclined to the opposed bearing face on the other member and causing the gripping members to move into and out of gripping relation to the members by their movements on said inclined faces, and shifting means positioned medially of said bearing faces independent of the clutch members for positively moving the rollers on the inclined faces; said inclined faces converging toward their opposed face at both ends to develop gripping action in either direction of movement of the rollers, but receding therefrom intermediately to permit the rollers to assume idling positions, and said shifting means embodying an annulus having radial projections adapted to lie in the path of the gripping rollers and being adapted to act upon the rollers in both directions, and being located to move the rollers into as well as out of gripping relation in either direction.

3. A roller clutch comprising an inner clutch member having a plurality of faces, an outer clutch member surrounding the inner clutch member and having a co-acting gripping face, and gripping rollers located between said faces; the inner clutch member being constructed of two parts, divided by a transverse radial plane and having an annular shifting member mounted between its parts, said shifting member having means attached thereto whereby said rollers may be shifted, one of said clutch members having radial flanges projecting from it and overlapping the other member to hold the parts against axial displacement, and means for actuating said shifting member.

The foregoing specification signed at Tooele, Utah, this 18th day of March, 1915.

ALPHONS L. WESTRICH.

In presence of—
  WM. S. MARKS,
  JOHN A. SMITH.

Copies of this patent may be obtained for five cents each, by addressing the "Commissioner of Patents, Washington, D. C."